(12) United States Patent
Choi

(10) Patent No.: US 7,258,267 B2
(45) Date of Patent: Aug. 21, 2007

(54) WIRELESS BANKING SYSTEM AND WIRELESS BANKING METHOD USING MOBILE PHONES

(75) Inventor: Hyun-il Choi, Seoul (KR)

(73) Assignee: Keyzap Inc., Victoria, BC (CA)

( * ) Notice: Subject to any disclaimer, the term of this patent is extended or adjusted under 35 U.S.C. 154(b) by 268 days.

(21) Appl. No.: 11/012,900

(22) Filed: Dec. 15, 2004

(65) Prior Publication Data

US 2005/0150945 A1 Jul. 14, 2005

(30) Foreign Application Priority Data

Dec. 19, 2003 (KR) ............................ 10-2003-93696

(51) Int. Cl.
*G07F 19/00* (2006.01)
(52) U.S. Cl. ..................... 235/379; 235/375; 235/492; 705/42; 705/44
(58) Field of Classification Search ................ 235/379, 235/380, 375, 492; 705/42, 44, 70, 75
See application file for complete search history.

(56) References Cited

U.S. PATENT DOCUMENTS

| | | | | |
|---|---|---|---|---|
| 5,923,884 | A * | 7/1999 | Peyret et al. ................ 717/167 |
| 6,142,369 | A * | 11/2000 | Jonstromer .................. 235/380 |
| 6,456,984 | B1 * | 9/2002 | Demoff et al. ................. 705/40 |
| 6,529,717 | B1 * | 3/2003 | Blants et al. ............. 455/186.1 |
| 6,807,410 | B1 * | 10/2004 | Pailles et al. ................ 455/407 |
| 6,816,724 | B1 * | 11/2004 | Asikainen ................ 455/414.1 |
| 6,847,816 | B1 * | 1/2005 | Sarradin ...................... 455/407 |
| 6,993,137 | B2 * | 1/2006 | Fransdonk ................... 380/279 |
| 6,996,409 | B2 * | 2/2006 | Gopinath et al. ........... 455/466 |
| 7,017,804 | B2 * | 3/2006 | Guion ......................... 235/380 |
| 2005/0184145 | A1 * | 8/2005 | Law et al. .................. 235/380 |

FOREIGN PATENT DOCUMENTS

| | | |
|---|---|---|
| EP | 1003139 A2 | 2/2001 |
| GB | 2376337 A | 12/2002 |
| WO | 0108110 A1 | 2/2001 |

OTHER PUBLICATIONS

Itani, W., and Kayssi, A., "J2ME End-to-End Security for M-Commerce," Proceedings of Wireless Communications and Networking Conference, 3:2015-2020, Piscataway, N.J., Mar. 16-20, 2003.

* cited by examiner

*Primary Examiner*—Ahshik Kim
(74) *Attorney, Agent, or Firm*—Christensen O'Connor Johnson Kindness PLLC

(57) ABSTRACT

The present invention generally relates to a wireless banking system and a wireless banking method using a mobile phone. The mobile phone includes a smart card inputting smart card information consisting of bank account information, log information, and an authentication key. A card applet is provided which operates the smart card information. The banking service uses a common full text and individual full texts used for banking transactions, prepared through the smart card information and an input of the mobile phone. An encoding/decoding module is provided for encoding the banking service full text and decoding the response to the banking service full text by using a session key; and a card manager communicating the application with the smart card.

5 Claims, 5 Drawing Sheets

WIRELESS BANKING SYSTEM AND WIRELESS BANKING METHOD USING MOBILE PHONES

BACKGROUND OF THE INVENTION

The present invention generally relates to a wireless banking system and a wireless banking method using a mobile phone, and more specifically, to a wireless banking system and a wireless banking method using a mobile phone to reduce a load of the mobile phone while safely and effectively providing a banking service, by generating a new session key whenever one communication full text is transmitted during a communication process between a client built in the mobile phone and a banking server to open a session between the client and the banking server and by cutting off the session if a result of the communication full text is transmitted to perform wireless communication in a stage only where a user employs the service.

Generally, in case a wireless service is used through wireless communication, the service is provided while a mobile phone is connected to a server which supplies the wireless service from the start to the end. At this time, a session key is generated during a handshake process synchronized between the mobile phone and the server at an early stage, and the generated session key is used to encode and decode communication, thereby maintaining a security system. In this case, a communication full text is divided into a common full text and individual full texts during the communication. While a session is open, one common full text is transmitted, and then plural individual full texts are transmitted until the communication is over, so that a user can use the wireless service.

To use a general wireless service by using the above method is not so problematic. However, it may cause unstable results when being used for a wireless service with regards to banking transactions such as money transferring, balance inquiry, and others.

The banking transactions must be highly secured while guaranteeing stability. But, in the prior wireless service, various full texts are transmitted while the session is open once, resulting in a possibility of session key exposure. Once the session key is exposed, problems occur during banking transactions. Also, wireless communication may be disconnected while using the service. Furthermore, since the wireless service is provided while being connected all the time, there causes an overload in a mobile phone system and a wireless service server.

In addition, users are reluctant to use the service owing to a burden about wireless communication charges.

SUMMARY OF THE INVENTION

It is therefore an object of the present invention to provide a wireless banking system and a wireless banking method using a mobile phone to safely and conveniently provide banking transactions such as money transferring, balance inquiry, and others at any place by using the mobile phone, so that users can freely use a wireless banking service.

To accomplish the above object, the mobile phone in accordance with the present invention can conduct wireless banking transactions in connection with a server system of a bank through a wireless communication network, comprising: a smart card inputting smart card information consisting of bank account information, log information, and an authentication key, and having a card applet which operates the smart card information; one banking service full text consisting of a common full text and individual full texts used for banking transactions being prepared through the smart card information and an input of the mobile phone; an application completing a session after receiving a response to the one banking service full text while transmitting the banking service full text, and having an encoding/decoding module for encoding the one banking service full text and decoding the response to the banking service full text by using a session key; and a card manager communicating the application with the smart card.

Moreover, to achieve the above object, a wireless banking system using a mobile phone in accordance with the present invention enables the mobile phone to conduct wireless banking transactions in connection with a server system of a bank through a communication network, and the mobile phone comprises: a smart card inputting smart card information consisting of bank account information, log information, and an authentication key, and having a card applet which operates the smart card information; one banking service full text consisting of a common full text and individual full texts used for banking transactions being prepared through the smart card information and an input of the mobile phone; an application completing a session after receiving a response to the one banking service full text while transmitting the banking service full text, and having an encoding/decoding module for encoding the one banking service full text and decoding the response to the banking service full text by using a session key; and a card manager communicating the application with the smart card.

And, the bank server system receiving a banking service full text in connection with the mobile phone through the communication network, transmitting a response to the banking service full text to the mobile phone, and having a wireless banking server exchanging a session key with the mobile phone and decoding the banking service full text while encoding the response to the banking service full text by using the session key.

In addition, to accomplish the above object, a wireless banking method using a mobile phone in accordance with the present invention comprises the steps of: a first step of preparing one banking service full text consisting of a common full text and individual full texts by using information on a smart card in the mobile phone where the smart card containing banking transaction information therein is attached; a second step of exchanging a session key during a handshake process by connecting the mobile phone with the wireless banking server; a third step of encoding the banking service full text and transmitting the encoded banking service full text to the wireless banking server by using the session key; a fourth step of the wireless banking server decoding the banking service full text by using the session key to activate the banking service; and a fifth step of the wireless banking server encoding an activated result of the banking service by using the session key, transmitting the encoded result to the mobile phone, and releasing a connection between the mobile phone and the wireless banking server.

BRIEF DESCRIPTION OF THE DRAWINGS

The invention, together with further aspects and advantages thereof, may best be understood by reference to the following description taken in conjunction with the accompanying drawings in which.

DETAILED DESCRIPTION OF THE PREFERRED EMBODIMENT

The present invention will now be described in detail with reference to exemplary preferred embodiments as illustrated in the accompanying drawings.

Figure 1:
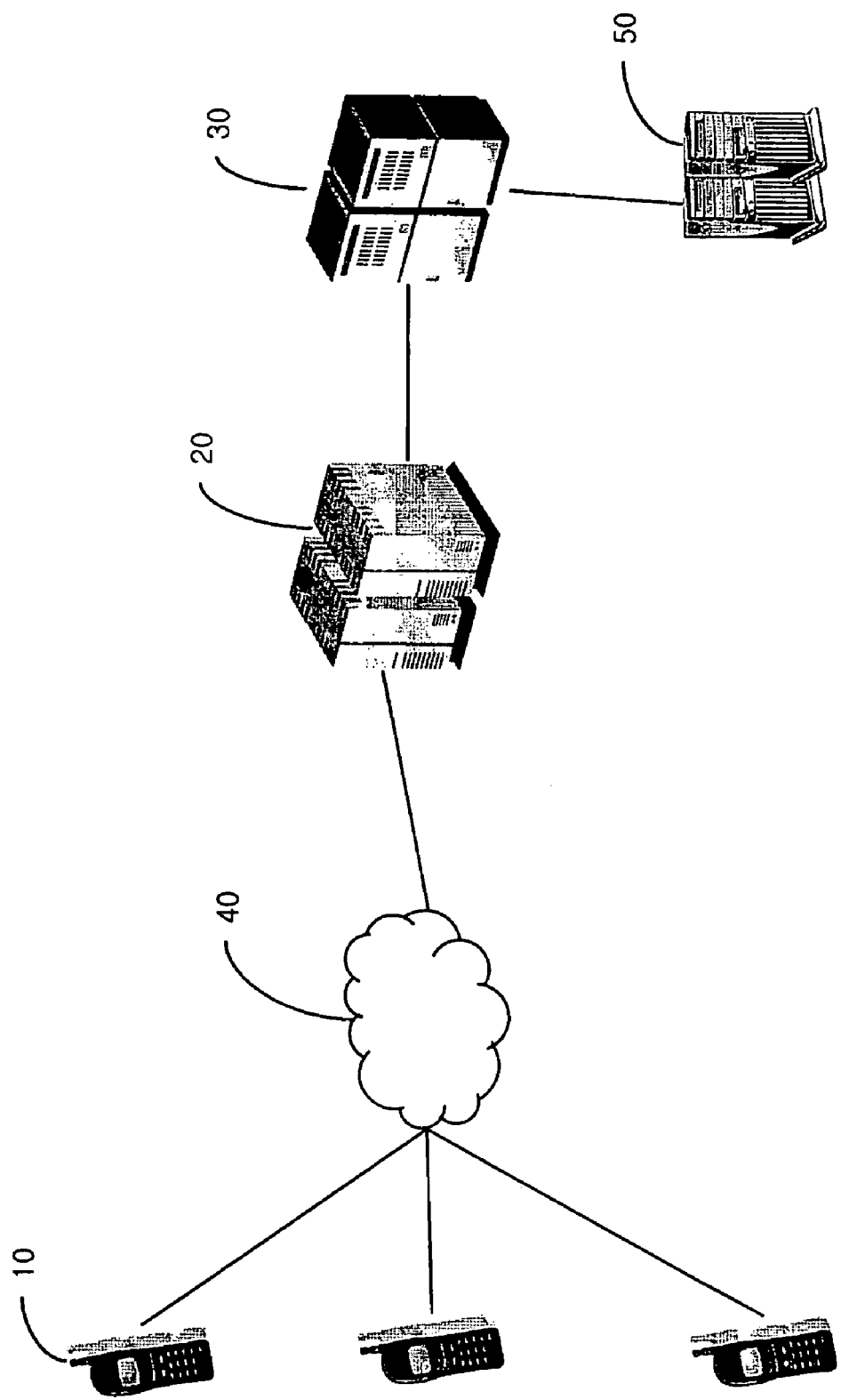
FIG. 1 is a system format diagram illustrating a structure of a wireless banking system using a mobile phone in accordance with the present invention.

FIG. 1 is a system format diagram illustrating a structure of a wireless banking system using a mobile phone in accordance with the present invention. Referring to FIG. 1, the wireless banking system using the mobile phone in accordance with the present invention consists of a mobile phone(10), a wireless banking server(30), and a wireless communication server(20).

The mobile phone(10) has a smart card inside while being installed with an application which uses information contained in the smart card and employs a banking service. The built-in smart card encodes information on the smart card, information on a bank account of a user, login information, and information on an authentication key to store the encoded information. Then, a banking service full text is prepared and encoded by using the application, and the encoded full text is transmitted to the wireless banking server(30) through a wireless communication network(40) by using the wireless communication server(20).

The wireless banking server(30) conducts wireless banking transactions by interworking with the mobile phone(10), exchanges a session key during a handshake process with the mobile phone(10), and releases a connection with the mobile phone(10) after processing the one banking service full text.

The banking transactions conducted through the wireless banking server(30) include balance inquiry, money transferring, check inquiry, withdrawal from ATM, etc.

The wireless communication server(20) enables communication between the mobile phone(10) and the wireless banking server(30). In this case, the mobile phone(10) and the wireless communication server(20) use the wireless communication network(40), and the wireless communication server(20) is connected with the wireless banking server(30) through a dedicated line. The wireless communication server(20) functions as a gateway between the mobile phone(10) and the wireless banking server(30). Besides, the mobile phone(10), the wireless banking server (30), and the wireless communication server(20) employ TCP/IP.

Figure 2:
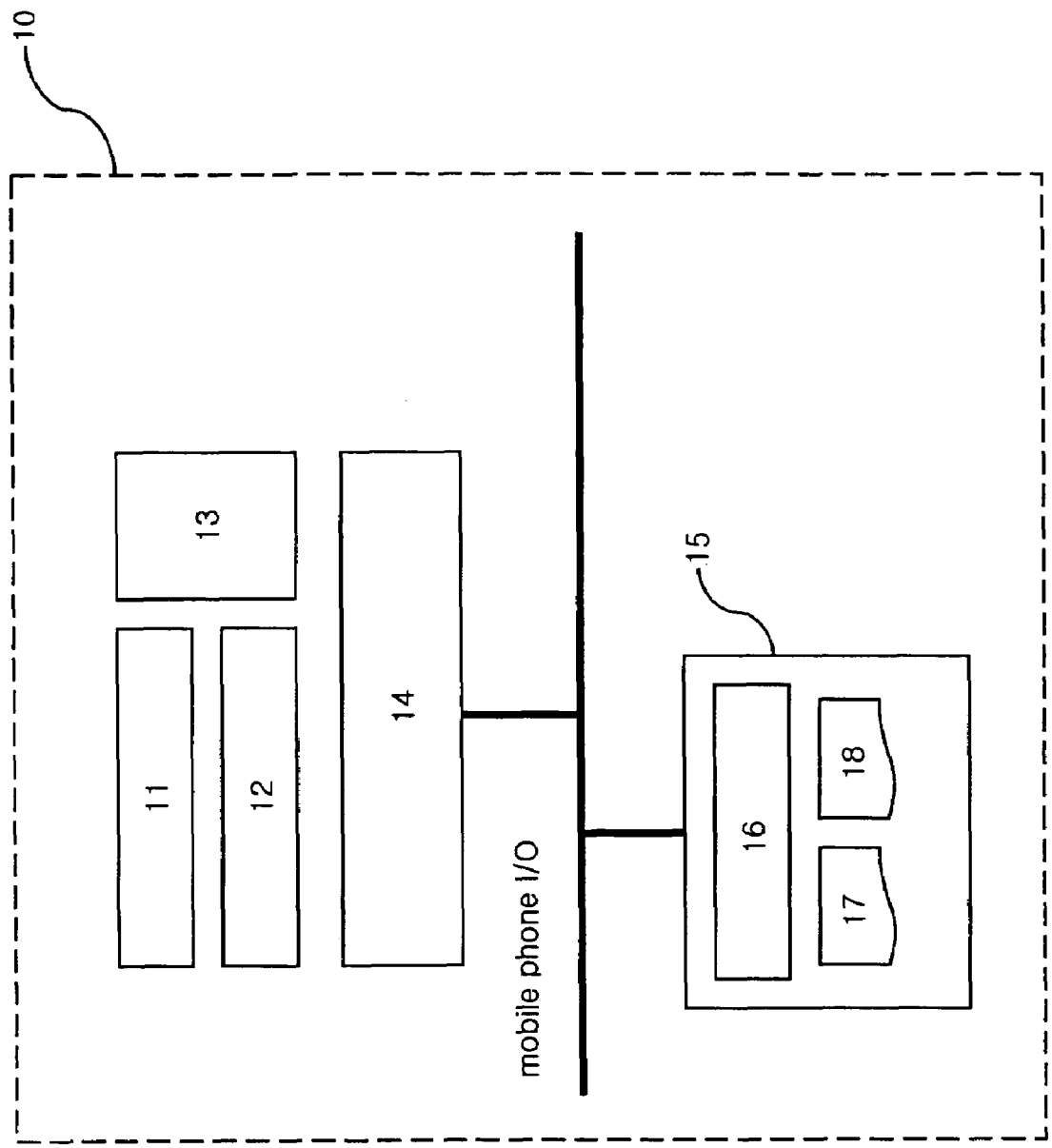
FIG. 2 is a format diagram illustrating a mobile phone system used for a wireless banking system using a mobile phone in accordance with the present invention.
Figure 3:
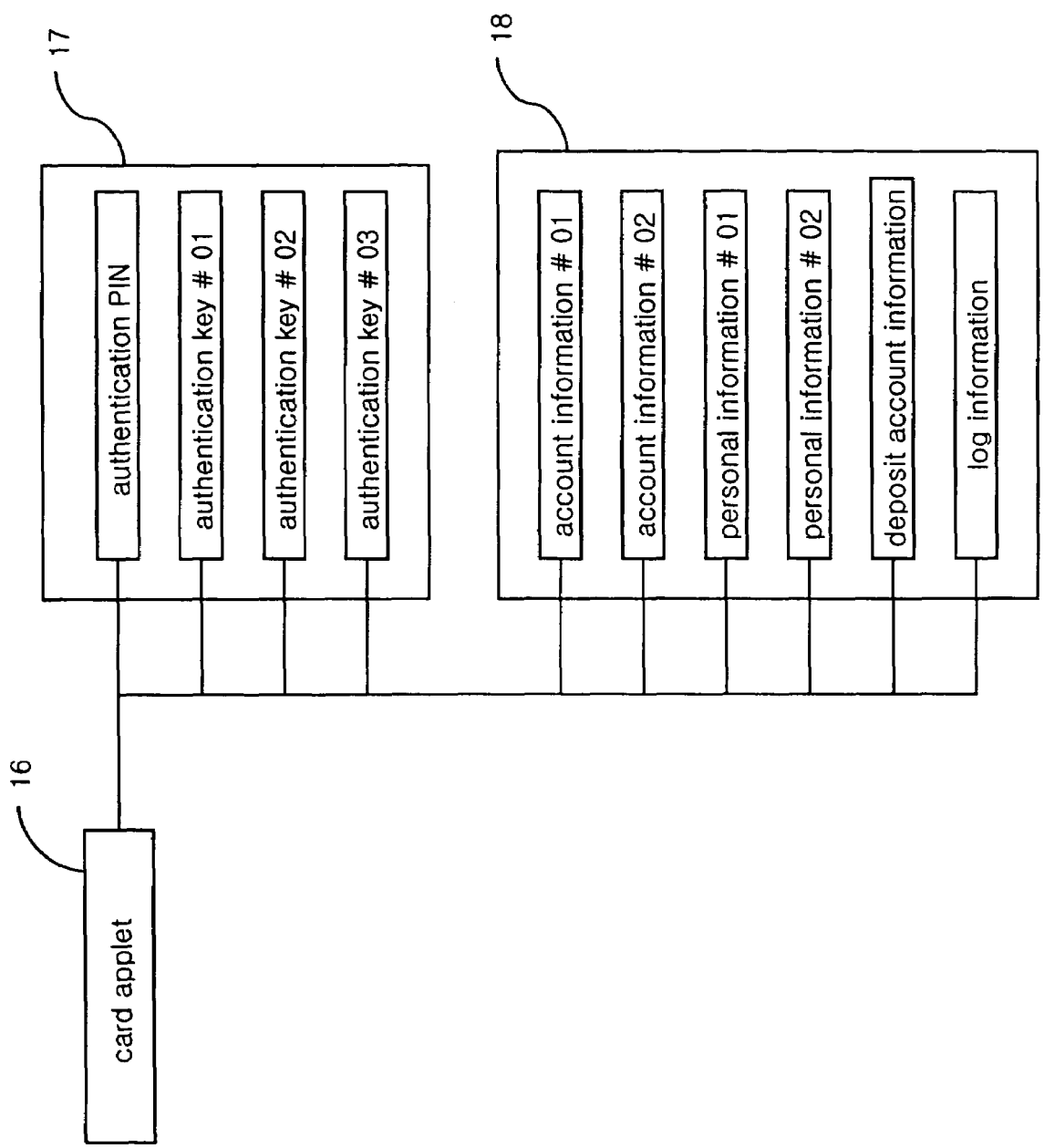
FIG. 3 is a diagram illustrating a structure of a card applet of a smart card.

FIG. 2 is a format diagram illustrating a mobile phone system used for a wireless banking system using a mobile phone in accordance with the present invention, and FIG. 3 is a diagram illustrating a structure of a card applet of a smart card.

Referring to FIG. 2 and FIG. 3, a smart card(15) is built in a mobile phone(10), and the mobile phone(10) comprises: a mobile phone OS(Operation System)(14) for driving the mobile phone(10); a wireless banking application(11) for using a wireless banking service; a VM(Virtual Machine) (12) for providing a proper environment where various applications can be operated in the mobile phone OS; and a card manager(13) for performing an interface role between the wireless banking application(11) and the smart card(15). In addition, the smart card(15) has a card applet(16), an application program of the smart card(15), while PIN information(17) for authentication and account information(18) are stored. Like shown in FIG. 3, in case of the card applet(16), information on authentication is stored in the PIN information(17) while account information, personal information, deposit account information, and login information are stored in the account information(18).

The wireless banking application(11) requests the card applet(16) to transmit information through the card manager (13) to use the information of the smart card(15). Thus, the card manager communicates with the card applet(16) through the mobile phone OS(14). The card applet(16) performs an authentication by reading information of the PIN information(17) for authentication, and transmits a value of the account information(18) to the wireless banking application(11) after the authentication. The wireless banking application(11) has an encoding module to prepare a banking service full text with the use of information formed by a user who operates the mobile phone(10) as well as information of the smart card(15), and encodes the banking service full text by using a session key exchanged with the wireless banking server. Then, the wireless banking application(11) decodes a response transmitted from the wireless banking server(30) by using a session key.

Moreover, the wireless banking application(11) enables a user to use a banking service by driving the wireless banking application through the mobile phone OS with the use of the VM(12). Accordingly, various menus for using the banking service and banking service results are displayed on a display window of the mobile phone by the wireless banking application(11).

Figure 4:
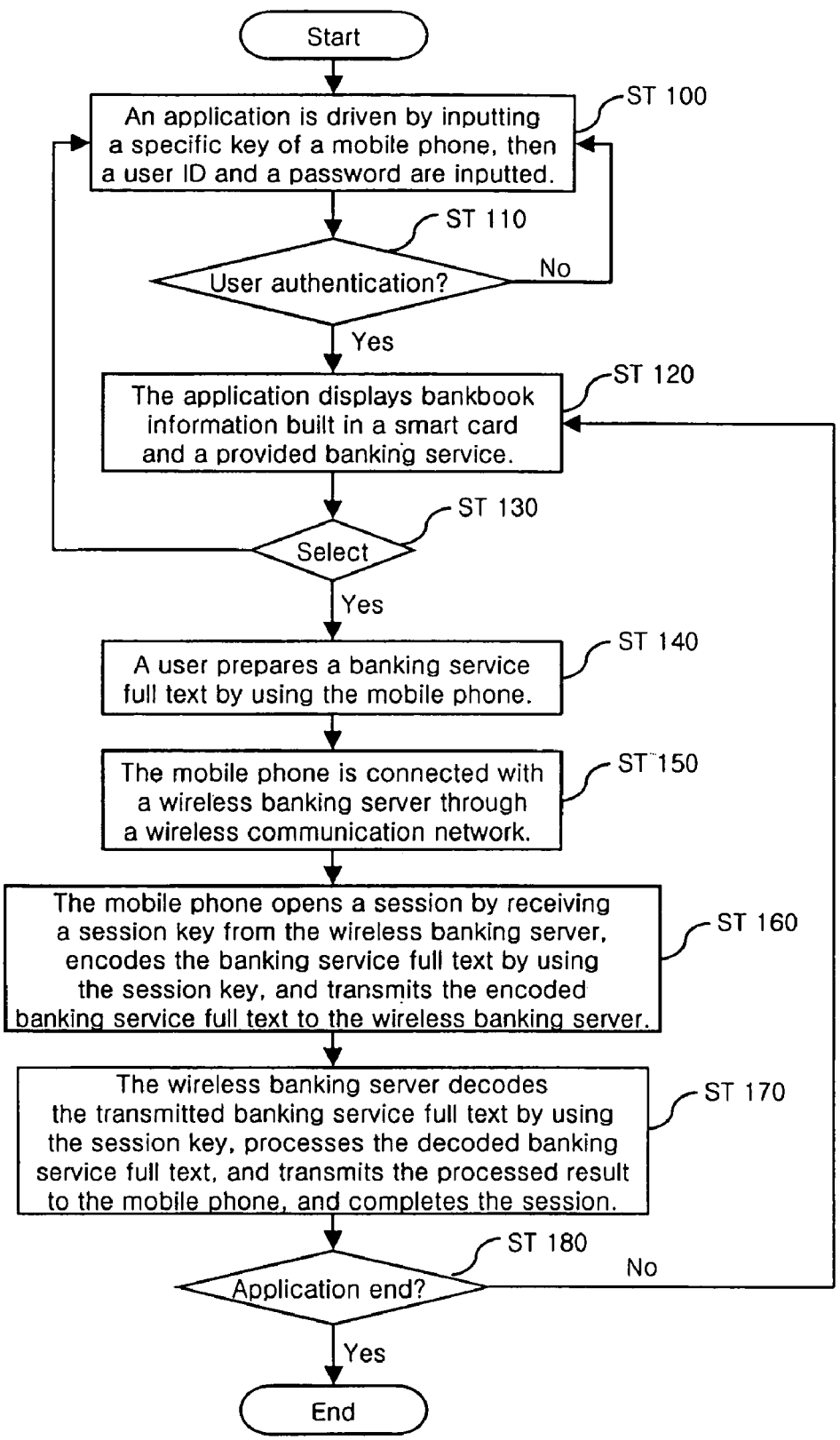
FIG. 4 is a flow chart showing a process of employing a balance inquiry by applying a wireless banking system using a mobile phone in accordance with the present invention.

FIG. 4 is a flow chart showing a process of using a balance inquiry by employing a wireless banking system using a mobile phone in accordance with the present invention.

Referring to FIG. 4, a user drives an application of the mobile phone(10) to use the balance inquiry among wireless banking transactions, and inputs a user ID and a password (ST 100). If the user ID and the password are correct(ST 110), the application displays a bank account number on a display window of the mobile phone(10), so that the user can use the wireless banking transactions by employing the displayed bank account number(ST 120). If the inputted information is not correct, the user inputs a user ID and a password again. The wireless banking transactions include balance inquiry, money transferring, withdrawal from ATM, and check inquiry. The user randomly selects one of the banking transactions, and starts the selected banking transaction(ST 130).

If the user selects the balance inquiry among the banking transactions, the application prepares a banking service full text. The banking service full text is divided into a common full text and individual full texts. The common full text is shown at Table 1 while the individual full texts are represented at Table 2(ST 140).

TABLE 1

| NO | Contents | Attribute | Length |
| --- | --- | --- | --- |
| 1 | Customer identification number | C | 8 |
| 2 | User code | C | 8 |
| 3 | Service code | C | 6 |
| 4 | Smart card serial number | C | 16 |
| 5 | Communication provider section code | C | 4 |
| 6 | VM section code | C | 1 |
| 7 | Applet version information | C | 10 |
| 8 | VM version information | C | 10 |
| 9 | Mobile phone number | C | 14 |
| 10 | Electronic bankbook key version | C | 2 |
| 11 | Cellular phone model name | C | 10 |

TABLE 2

| NO | Contents | Attribute | Length |
| --- | --- | --- | --- |
| 1 | Request key | C | 16 |
| 2 | Account number | C | 4 |
| 3 | Password | C | 8 |
| 4 | Date of start of inquiry | P | 8 |
| 5 | Date of termination of inquiry | P | 13 |
| 6 | Business number | C | 13 |
| 7 | Response method | C | 1 |

The attribute item of Table 1 and Table 2 represents a shape of an inputted character, while C is a character, P is a number, and C-H show that Korean alphabet and English alphabet can be inputted.

Then, if the user inputs a specific button(for instance, a button which shows completion of preparing for the banking service full text), the application of the mobile phone(10) accesses the wireless banking server(30) through the wireless communication network(40)(ST 150). When the mobile phone(10) is connected with the wireless banking server(30), the wireless banking server(30) and the mobile phone(10) exchange a session key. Then, the mobile phone(10) encodes the banking service full text by using the session key, and transmits the encoded text to the wireless banking server(30)(ST 160). The wireless banking server(30) decodes the encoded banking service full text by using the session key, and perceives the banking service full text transmitted from the mobile phone(10). Information on the mobile phone(10), information on the smart card, and information on a user account are understood through the common full text of the banking service full text, whereas information on balance inquiry is perceived through the individual full texts. Finally, a response to the balance inquiry is encoded by the session key, and is transmitted to the user's mobile phone(10), completing the session. A response transmitted to the mobile phone(10) from the wireless banking server(30) also consists of a common full text and individual full texts, and the session is completed after transmitting one response. The mobile phone(10) decodes results transmitted from the wireless banking server(30) by using the session key, and displays the decoded result such that the user can see it(ST 170).

At this moment, the banking service can be requested again. In this case, the banking service may be demanded again while the application is not completed, and the banking service can be requested again after the application is completed as well. On this occasion, if the banking service is provided while the application is not completed, the user prepares a banking service full text by selecting one of banking services and accesses the wireless banking server(30) through the wireless communication network(40), while a new session key(10) is exchanged with the mobile phone(10) to maintain a connection, and the banking service full text is exchanged with a service result. Finally, the connection is cut off again.

Furthermore, if the banking service is requested again while the application is completed, the user inputs a user ID and a password again for a user authentication by using the application of the mobile phone, thereby maintaining security(ST 180).

Therefore, when the banking service is used all the time, the banking service full text consists of a common full text and individual full texts.

Other banking transactions but the balance inquiry shown in FIG. 4 can be also carried out via the same procedure as the balance inquiry.

Figure 5:
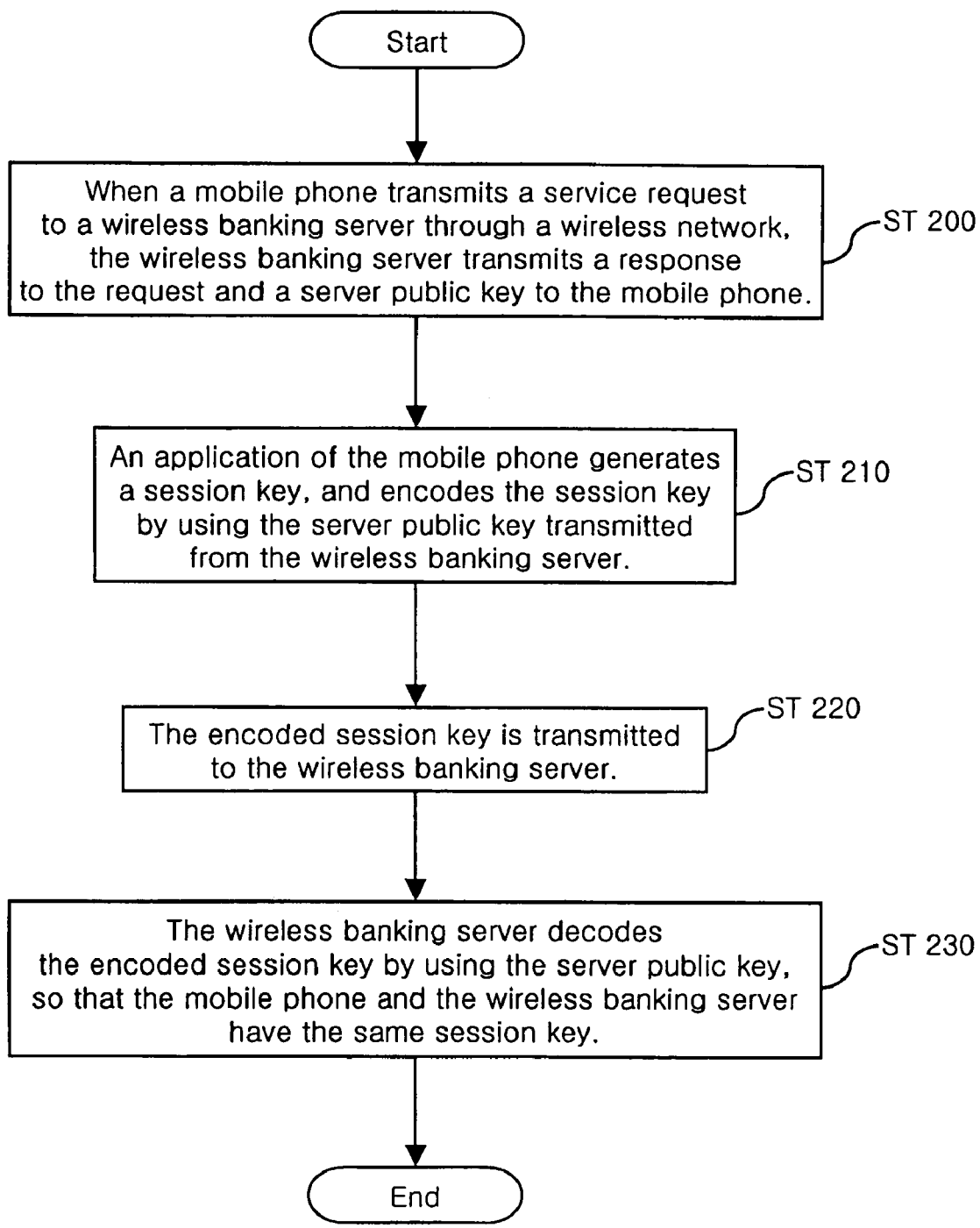
FIG. 5 is a diagram illustrating one embodiment of a handshake process for exchanging a session key in a wireless banking system using a mobile phone in accordance with the present invention.

FIG. 5 is a diagram illustrating one embodiment of a handshake process for exchanging a session key in a wireless banking system using a mobile phone in accordance with the present invention.

Referring to FIG. 5, when the mobile phone(10) transmits a service request to the wireless banking server(30) through a wireless network(40), the wireless banking server(30) transmits a response and a server public key to the mobile phone(10)(ST 200). An application of the mobile phone(10) generates a session key, and encodes the session key by using the server public key transmitted from the wireless banking server(30)(ST 210). The encoded session key is retransmitted to the wireless banking server(30)(ST 220). And, the wireless banking server(30) decodes the encoded session key by using the server public key, so that the mobile phone(10) and the wireless banking server(30) can have the same session key(ST 230).

The process of exchanging the session key shown in FIG. 5 represents one embodiment only. Thus, the session key can be exchanged by using another method except the above method.

According to a wireless banking system and a wireless banking method using a mobile phone in accordance with the present invention, a user uses a banking service one time with one session key by exchanging one banking service full text and an exchanged result while a session is open, without using the service when the session is continuously open.

As a result, even though there is a possibility of communication disconnection when the mobile phone is used, the user can use the banking service without any problem during the communication disconnection, since one banking service full text is transmitted while a session is open and the other banking service full text is transmitted while the session is open again. In addition, because the session key is continuously generated to encode the banking service full text, there is no risk of session key exposure, thereby guaranteeing security.

While the present invention has been described in connection with a number of embodiments and implementations, the present invention is not so limited but covers various obvious modifications and equivalent arrangements, which fall within the purview of the appended claims.

What is claimed is:

1. A mobile phone for conducting wireless banking transactions in connection with a server system of a bank through a wireless communication network, comprising:
  a smart card inputting smart card information consisting of bank account information, log information, and an authentication key, and having a card applet which operates the smart card information;
  one banking service full text consisting of a common full text and individual full texts used for banking transactions being prepared through the smart card information and an input of the mobile phone;

an application completing a transaction after receiving a response to the one banking service full text while transmitting the banking service full text, and having an encoding/decoding module for encoding the one banking service full text and decoding the response to the banking service full text by using a session key, wherein a new session key is allocated to each banking service full text when said application transmits each banking service full text; and a card manager communicating the application with the smart card.

2. A wireless banking system which enables a mobile phone to conduct wireless banking transactions in connection with a server system of a bank through a communication network, comprising:

the mobile phone, comprising:

a smart card inputting smart card information consisting of bank account information, log information, and an authentication key, and having a card applet which operates the smart card information;

one banking service full text consisting of a common full text and individual full texts used for banking transactions being prepared through the smart card information and an input of the mobile phone;

an application completing a transaction after receiving a response to the one banking service full text while transmitting the banking service full text, and having an encoding/decoding module for encoding the one banking service full text and decoding the response to the banking service full text by using a session key, wherein a new session key is allocated to each banking service full text when said application transmits each banking service full text; and a card manager communicating the application with the smart card; and the bank server system receiving the banking service full text in connection with the mobile phone through the communication network, and transmitting a response to the banking service full text to the mobile phone, comprising:

a wireless banking server exchanging a session key with the mobile phone and decoding the banking service full text while encoding the response to the banking service full text by using the session key.

3. A wireless banking method using a mobile phone, comprising the steps of:

a first step of preparing one banking service full text consisting of a common full text and individual full texts by using information on a smart card in the mobile phone where the smart card containing banking transaction information therein is attached;

a second step of exchanging a session key during a handshake process by connecting the mobile phone with the wireless banking server;

a third step of encoding the banking service full text and transmitting the encoded banking service full text to the wireless banking server by using the session key;

a fourth step of the wireless banking server decoding the banking service full text by using the session key to activate the banking service; and a fifth step of the wireless banking server encoding an activated result of the banking service by using the session key, and transmitting the encoded result to the mobile phone, wherein a new session key is allocated to each banking service full text when said application transmits each banking service full text.

4. The wireless banking method of claim 3, wherein the first step comprises the steps of:

authenticating through authentication information of the smart card;

identifying the banking transaction information contained in the smart card; and preparing the one banking service full text.

5. A wireless banking method using a mobile phone, comprising the steps of:

a first step of preparing one banking service full text consisting of a common full text and individual full texts by using information on a smart card in the mobile phone where the smart card containing banking transaction information therein is attached;

a second step of exchanging a session key during a handshake process by connecting the mobile phone with the wireless banking server;

a third step of encoding the banking service full text and transmitting the encoded banking service full text to the wireless banking server by using the session key;

a fourth step of the wireless banking server decoding the banking service full text by using the session key to activate the banking service; and a fifth step of the wireless banking server encoding an activated result of the banking service by using the session key, transmitting the encoded result to the mobile phone, input of the mobile phone to initiate a further transaction after transmission of the response being a new session with a new session key being allocated.

* * * * *